United States Patent
Kato et al.

[11] Patent Number: 5,195,065
[45] Date of Patent: Mar. 16, 1993

[54] FUNCTION SETTING METHOD FOR AUDIO SYSTEM

[75] Inventors: Seiji Kato; Akio Namiki, both of Saitama, Japan

[73] Assignee: Pioneer Electronic Corporation, Tokyo, Japan

[21] Appl. No.: 624,869

[22] Filed: Dec. 10, 1990

[30] Foreign Application Priority Data

Mar. 30, 1990 [JP] Japan ................... 2-081010

[51] Int. Cl.$^5$ .................... H04B 1/20; H03K 17/94
[52] U.S. Cl. ............................... 369/2; 369/6; 341/23; 341/34; 340/706
[58] Field of Search ............ 369/2, 6; 364/138, 139, 364/705.01, 705.04, 705.05, 709.01; 341/23, 34; 340/706; 381/68.2, 68.4, 86

[56] References Cited

U.S. PATENT DOCUMENTS

| | | | |
|---|---|---|---|
| 3,956,591 | 5/1976 | Gates, Jr. ................. | 369/6 |
| 4,060,766 | 11/1977 | Kazuo ..................... | 369/6 |
| 4,082,942 | 4/1978 | Tada et al. ............... | 364/139 |
| 4,424,574 | 1/1984 | Enoki et al. .............. | 369/2 |
| 4,525,820 | 6/1985 | Enoki et al. .............. | 369/2 |

Primary Examiner—Joseph A. Popek
Assistant Examiner—Tan Nguyen
Attorney, Agent, or Firm—Sughrue, Mion, Zinn, Macpeak & Seas

[57] ABSTRACT

A function setting method for an audio system which is capable of changing a function of the audio system without alternation of hardware of a system controller at all and is superior in general use. The method comprises the steps of preparing, as the system controller for controlling functions incorporated in the audio system in a concentrated manner, a microcomputer which has an analog/digital conversion input port and has built therein control programs for all of a plurality of functions which can be incorporated in the audio system, and applying a selected one of a plurality of analog voltages which individually represent possible combinations of the functions including the individual functions to the analog/digital conversion input port of the microcomputer to cause the microcomputer to be prepared for one or ones of the functions represented by the analog voltage.

8 Claims, 4 Drawing Sheets

FIG. 3

| ANALOG VOLTAGE Vi | ADDITIONAL SOURCES RADIO | CLOCK | REMOVABLE OPERATING SECTION |
|---|---|---|---|
| V7 | 1 | 1 | 1 |
| V6 | 1 | 1 | 0 |
| V5 | 1 | 0 | 1 |
| V4 | 1 | 0 | 0 |
| V3 | 0 | 1 | 1 |
| V2 | 0 | 1 | 0 |
| V1 | 0 | 0 | 1 |
| V0 | 0 | 0 | 0 |

1 : PRESENCE
0 : ABSENCE

FUNCTION SETTING METHOD FOR AUDIO SYSTEM

BACKGROUND OF THE INVENTION

1. Field of the Invention

This invention relates to a function setting method for an audio system which is constructed such that sources incorporated therein are controlled in a concentrated manner by a system controller.

2. Description of the Prior Art

An audio system, for example, of the car-carried type is normally constructed such that a plurality of audio sources, such as a compact disk player, a cassette tape deck, a radio set and a clock are incorporated in an integrated relationship as a system therein. Those sources are controlled in a concentrated manner by a system controller which may be, for example, in the form of a microcomputer.

The functions of an audio system, for example, the types and number of sources to be combined, are variously different depending upon grades or points of destination (for domestic use, for abroad and so forth) of products, and products must be manufactured in accordance with such functions. Conventionally, in order to change such functions, it is a common practice to replace a microcomputer serving as a system controller with another microcomputer in which control programs conforming to object component sources are built or to make use of a function setting circuit additionally provided for a microcomputer serving as a system controller.

An exemplary one of the above-described conventional audio systems which employ a function setting circuit in addition to a microcomputer serving as a system controller is shown in FIG. 4. Referring to FIG. 4, with the audio system shown, control programs for all functions of the audio system are built in advance in a microcomputer 41 serving as a system controller for the audio system, and connection of diode pairs in a function setting circuit 42 is changed to select a control program or programs corresponding to a desired function or functions from among the built-in programs. For example, where diode pairs 43, 44 and 45 in the function changing circuit 42 are individually connected to such positions as shown in FIG. 4, if a power source for the audio system is switched on, then a ground potential, that is, 0 volt, is supplied for a fixed period of time to a data scan terminal KS5 of the microcomputer 41 from the function setting circuit 42. Data input terminals KR0, KR1 and KR3 are connected to the data scan terminal KS5 by way of diode parts 43, 44 and 45, respectively, while only a data input terminal KR2 is not connected to the data scan terminal KS5. Accordingly, when a ground potential is supplied to the data scan terminal KS5 as described above, function setting data "0010", corresponding to the connection of the diode pairs shown in FIG. 4, are taken into the microcomputer 41 by way of the data input terminals KR0 to KR3. The data "0010" here are determined in advance such that they correspond to a certain function to be set, and a control program for the function corresponding to the data "0010" is selected from among the control programs built in the microcomputer 41 to perform setting of a function of the object. In order to change a function to be set, connection of the diode pairs in the function setting circuit 42 should be changed correspondingly to a desired function to be set. Since the four data input terminals KR0 to KR3 are used as data input terminals in the circuit shown in FIG. 4, a total of 16 functions corresponding to function setting data "0000" to "1111" can be set with the audio system.

It is to be noted that the reason why the diode pairs 43 to 45 are used for setting of a function in FIG. 4 is that it is intended to prevent a possible roundabout of a ground potential from such commonly connected other circuits because not only the function setting circuit 42 described above but also, for example, a key matrix circuit 46 provided on a key input panel are connected commonly to the data input terminals KR0 to KR3.

While setting of a function is performed in such a manner as described above with the conventional audio system shown in FIG. 4, in order to effect changing of a function, alteration of hardware of the system controller must be performed such that a number of different microcomputers corresponding to the number of functions to be changed are prepared or that the connection of the diodes of the function setting circuit of the system controller is changed in accordance with a function or functions to be newly obtained.

SUMMARY OF THE INVENTION

It is an object of the present invention to provide a function setting method for an audio system which is capable of changing a function of the audio system without alteration of hardware of a system controller at all and is superior in general use.

In order to attain the object, according to the present invention, there is provided a function setting method for an audio system which is constructed such that sources incorporated therein are controlled in a concentrated manner by a system controller, wherein a microcomputer having an analog/digital conversion input port is used as the system controller; control programs for all of functions which can be set with the audio system are built in the microcomputer, and a number of function setting patterns provided by possible combinations of the functions are made; and a desired one or ones of the functions are set by applying, to the analog/digital conversion input port of the microcomputer, one of a plurality of different analog voltages individually corresponding to the function setting patterns which represents one of the function setting patterns which corresponds to the desired one or ones of the functions.

With the function setting method, a desired function can be selectively set from among the various functions prepared in advance merely by changing the value of the analog voltage for the function setting to be applied to the analog/digital conversion input port of the microcomputer serving as the system controller. Accordingly, the necessity of performing alteration of hardware of the system controller as in the prior art is eliminated, and changing of a function involved in alteration of a grade or a point of destination of a product can be performed readily. Consequenly, reduction in production cost of an audio system can be achieved.

The above and other objects, features and advantages of the present invention will become apparent from the following description and the appended claims, taken in conjunction with the accompanying drawings.

BRIEF DESCRIPTION OF THE DRAWINGS

FIG. 3 is a table illustrating a relationship between an analog voltage for the function setting and additional sources of the audio system of FIG. 1.

DESCRIPTION OF THE PREFERRED EMBODIMENTS

Figure 1:
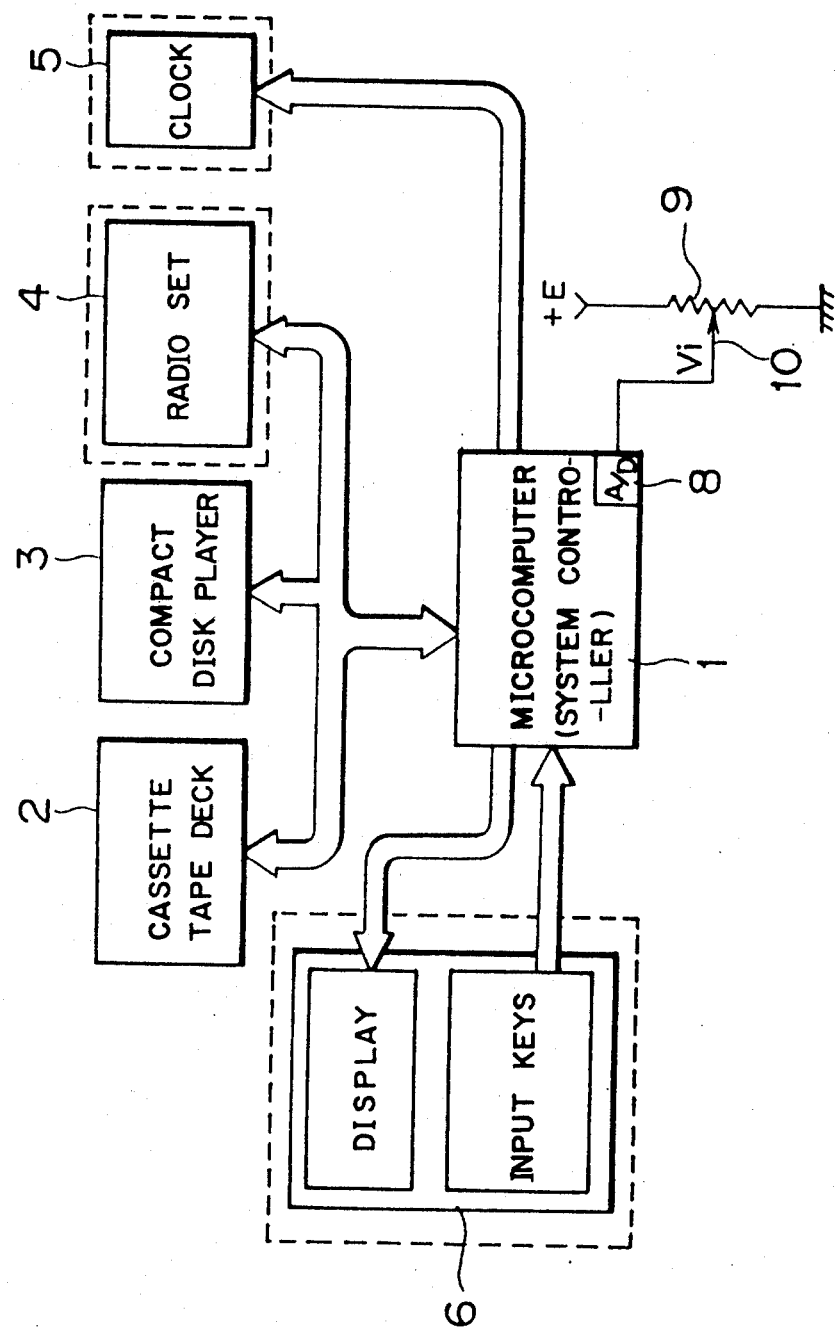
FIG. 1 is a block diagram of an audio system of the car-carried type to which a function setting method of the present invention is applied.
Figure 2:
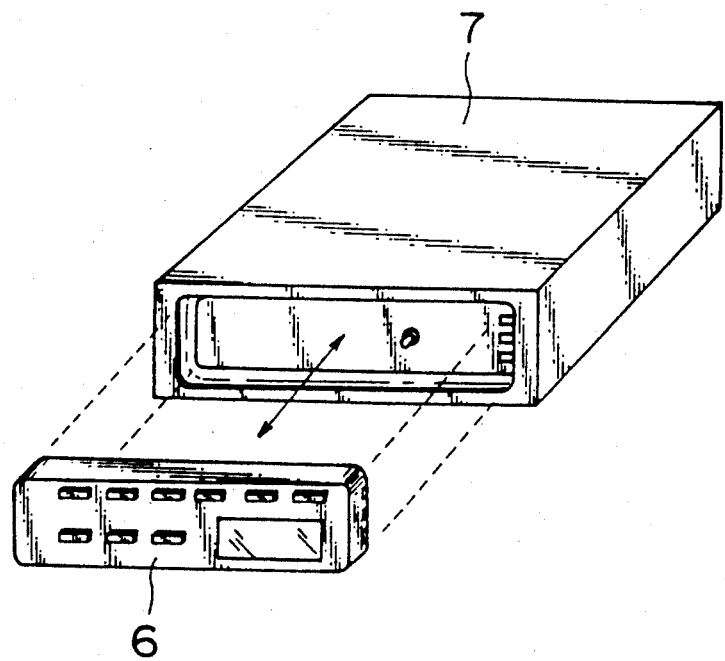
FIG. 2 is a fragmentary perspective view showing a removable operating section removed from a body of the audio system of FIG. 1.
Figure 4:
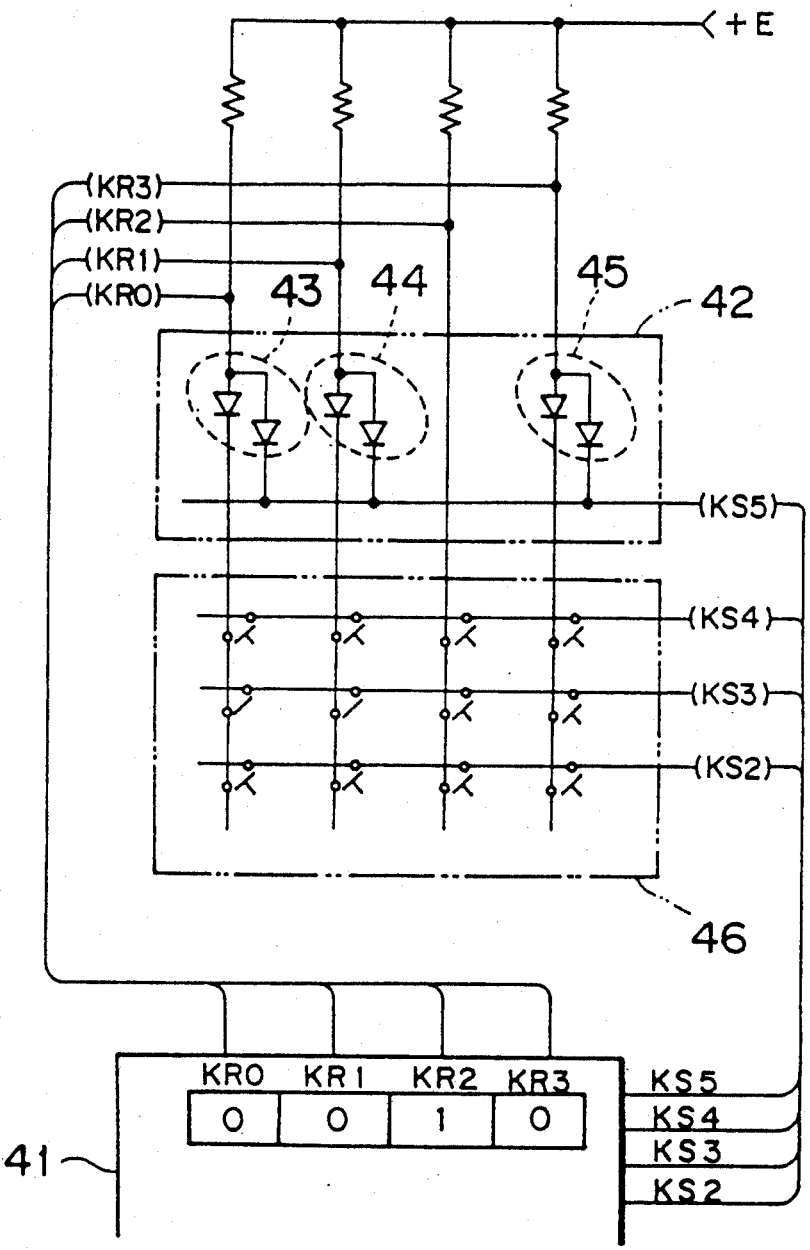
FIG. 4 is a block diagram showing a conventional audio system to which a conventional function setting method is applied.

Referring first to FIG. 1, there is shown an audio system to which a function setting method of the present invention is applied. The audio system shown includes a microcomputer 1 serving as a system controller, and several equipment connected to the microcomputer 1 and serving as audio sources. Such equipment are divided into two types, including standard equipment serving as basic audio sources which are always provided in an audio system irrespective of a type of the audio system, that is, irrespective of a grade or a point of destination of the audio system as a product, and additional equipments serving as additional audio sources which may be selectively provided in an audio system in accordance with a grade, a point of destination of the audio system as a product, or both. In the audio system shown in FIG. 1, the standard equipment include a cassette tape deck 2 and a compact disk player 3, while the additional equipment include a radio set 4, a clock 5, and a removable operating section 6, which are each surrounded by a broken line in FIG. 1. It is to be noted that the removable operating section 6 can be removed from an audio system body 7 as illustrated in FIG. 2 in order to prevent the audio system of the car-carried type from being stolen. In particular, upon parking or stopping of a car in which the audio system is incorporated, the operating section 6 will be removed and carried by a driver so as to render the audio system body 7, remaining in the car, useless thereby preventing possible stealth of the audio system.

Referring back to FIG. 1, the microcomputer 1, serving as a system controller, has an analog/digital conversion input port 8. Control programs for all of the functions which can be selected with the audio system are built in advance in the microcomputer 1. A voltage dividing resistor 9 is connected to the analog/digital conversion input port 8 such that a desired analog voltage Vi for the function setting can be applied to the analog/digital conversion input port 8 of the microcomputer 1 by adjusting a slider 10 thereof.

Meanwhile, up to 8 function setting patterns representative of various possible combinations of the three additional sources of the radio set 4, clock 5 and removable operating section 6 are produced in advance, as shown in FIG. 3. In the table of FIG. 3, the value "1" denotes presence or provision of an additional source while the value "0" denotes absence or no provision of an additional source. The function setting patterns are so related to the analog voltage Vi of the voltage dividing resistor 9 that they may be indicated by different values $V_0$ to $V_7$ of the analog voltage Vi. Thus, if the slider 10 is operated to output one of the values $V_0$ to $V_7$ of the analog voltage Vi from the voltage driving resistor 9, then a corresponding combination of the additional sources is selected by the microcomputer 1. It is to be noted that a combination may include none or only one of the additional sources 4, 5 and 6 and the analog voltages $V_0$, $V_4$, $V_2$ and $V_1$ correspond to such combinations, respectively, as seen from the table of FIG. 3.

With the audio system, function setting proceeds as follows.

First, an additional source or sources to be incorporated in an audio system to be manufactured is determined in accordance with specifications of a product which may vary depending upon a grade or a point of destination of the product. Here, it is assumed that an audio system to be manufactured should include a radio set 4 and a removable operating section 6. Thus, it is subsequently determined from the table of FIG. 3 that the analog voltage Vi corresponding to the combination of the additional sources, that is, the radio set 4 and the removable operating section 6, is $V_5 (= "101")$. Accordingly, the slider 10 of the voltage dividing resistor 9 is then manually adjusted to effect setting of a voltage so that $Vi = V_5$ may be reached. Finally, a cassette tape deck 2 and a compact disk player 3 as standard sources, and a radio set 4 and a removable operating section 6 as additional sources are incorporated in an integrated relationship as a system to obtain an audio system of the car-carried type of the object.

With the audio system of the car-carried type manufactured in this manner, when a power source for the audio system is made available in order to use the same, the analog voltage $V_5$ for the function setting is inputted to the analog/digital conversion input port 8 of the microcomputer 1. The voltage $V_5$ is converted into a corresponding digital code "101" at the analog/digital conversion input port 8 and is taken into the microcomputer 1. Then, the microcomputer 1 determines from the digital code "101" that the radio set 4 and the removable operating section 6 are incorporated as additional sources in the audio system, and reads out, from among the control programs built therein, those programs for controlling operation of the radio set 4 and removable operating section 6 as additional sources. After then, operation of the audio system is controlled in a concentrated manner by the microcomputer 1 using the control programs for the cassette tape deck 2 and compact disk player 3 as standard sources and the control programs for the additional sources of the radio set 4 and removable operating section 6.

Accordingly, with the audio system to which the function setting method of the present invention is applied, a function of an object can be realized only by changing the value of the analog voltage Vi to the analog/digital conversion input port 8 of the microcomputer 1 in accordance with the relationship illustrated in FIG. 2 without making any change of hardware itself of the system controller.

It is to be noted that, while the embodiment described above is described taking as an example the case wherein the type of an additional source is changed, the manner of use of the individual sources equipped in the audio system may be changed alternatively or additionally. As an example of such function changing, it may be possible, for example, to install two back lights for green and orange at a liquid crystal display section of the operation panel of the audio system and to effect function setting such that, in the case of an audio system to the destination of Europe, the green back light is lit, but on the other hand, in the case of an audio system to the destination of the United States of America, the orange back light is lit. Further, if the number of conversion bits at the analog/digital conversion input port 8 of the microcomputer 1 serving as a system controller is increased, then the number of functions which can be selected can be increased accordingly.

Having now fully described the invention, it will be apparent to one of ordinary skill in the art that many changes and modifications can be made thereto without departing from the spirit and scope of the invention as set forth herein.

What is claimed is:

1. A function setting method for an audio system which is constructed such that sources incorporated therein are controlled in a concentrated manner by a system controller, wherein a microcomputer having an analog/digital conversion input port is used as said system controller; a plurality of different control programs corresponding to all of the functions which are to be set with said audio system are built in said microcomputer, and a number of function setting patterns provided by possible combinations of said functions are made, said method comprising the step of selecting a desired control program corresponding to a combination of said functions by applying, to said analog/digital conversion input port of said microcomputer, one of a plurality of different analog voltages individually corresponding to said function setting patterns which represents one of said function setting patterns which corresponds to the desired one or ones of said functions.

2. A function setting method for an audio system which is constructed such that functions incorporated therein are controlled in a concentrated manner by a system controller, comprising the steps of preparing, as said system controller, a microcomputer which has an analog/digital conversion input port and has built therein control programs for all of a plurality of functions which are to be incorporated in said audio system, and applying a selected one of a plurality of analog voltages which individually represent possible combinations of said functions including the individual functions to said analog/digital conversion input port of said microcomputer to cause said microcomputer to be prepared for a combination of said functions represented by the analog voltage.

3. An audio system, comprising a system controller capable of controlling operation of a predetermined plural number of different audio sources and having control programs for said audio sources built therein, at least two audio sources connected to said system controller, analog voltage producing means for producing that one of a plurality of different analog voltages individually representing possible combinations of the predetermined plural number of different audio sources which represents a combination of said at least two audio sources connected to said system controller, and decoding means connected to receive an analog voltage from said analog voltage producing means for discriminating said at least two audio sources connected to said system controller, wherein said system controller controls, in response to discrimination of said decoding means, operation of said at least two audio sources connected thereto in accordance with a selected one of said control programs corresponding to said one analog voltage.

4. An audio system as claimed in claim 3, wherein said analog voltage producing means includes a manually operable voltage dividing resistor.

5. An audio system as claimed in claim 3, wherein said system controller includes a microcomputer having an analog/digital conversion input port which is connected to said analog voltage producing means, and serves as said decoding means.

6. An audio system, comprising at least one first audio source, a system controller, connected to said first audio source, and capable of controlling operation of a predetermined plural number of different audio sources more than two including said first audio source, said system controller having control programs for said audio sources built therein, at least one second audio sources connected to said system controller, analog voltage producing means for producing that one of a plurality of different analog voltages individually representing possible combinations of the predetermined plural number of different audio sources except said at least one first audio source which represents a combination of said at least one second audio source connected to said system controller, and decoding means connected to receive an analog voltage from said analog voltage producing means for discriminating said at least one second audio source connected to said system controller, said system controller controlling, in response to discrimination of said decoding means, operation of said first and second audio sources connected thereto in accordance with a selected one of said control programs corresponding to said one analog voltage.

7. An audio system as claimed in claim 6, wherein said analog voltage producing means includes a manually operable voltage dividing resistor.

8. An audio system as claimed in claim 6, wherein said system controller includes a microcomputer having an analog/digital conversion input port which is connected to said analog voltage producing means and serves as said decoding means.

* * * * *